May 9, 1967 H. W. DIETERT 3,318,156

PHYSICAL PROPERTIES TESTING APPARATUS

Original Filed Feb. 18, 1963

INVENTOR.
HARRY W. DIETERT
BY
ATTORNEYS

3,318,156
PHYSICAL PROPERTIES TESTING APPARATUS
Harry W. Dietert, Kerrville, Tex., assignor to Harry W.
Dietert Co., Detroit, Mich., a corporation of Michigan
Original application Feb. 18, 1963, Ser. No. 259,069, now
Patent No. 3,168,926, dated Feb. 9, 1965. Divided
and this application July 30, 1964, Ser. No. 386,351
6 Claims. (Cl. 73—432)

This application is a division of application, Ser. No. 259,069, filed Feb. 18, 1963, now Patent No. 3,168,926.

The invention relates to material conditioning apparatus and refers more specifically to apparatus for testing the physical properties of conditioned foundry granular material or the like and producing an electrical signal varying in proportion to the physical properties of the granular material tested.

In the past testing of conditioned granular material or the like has often been performed by removing separate individual samples from a granular material mixer, compressing the sample into a particular form, and then testing the sample to destruction to determine a particular physical property, such as compressive or shear strength. An additive, such as a bonding agent, has then usually been added to the granular material in accordance with the tested physical property.

Such procedures are time consuming and are usually not necessary in foundry operations wherein the characteristics of the granular material do not change substantially from one batch of granular material to the next.

It is therefore one of the objects of the present invention to provide improved apparatus for testing the physical properties of conditioned granular material.

Another object is to provide apparatus for testing physical properties of granular material comprising means for compacting a substantially constant sample of granular material, means for determining the physical properties thereof, and means for producing an electrical signal proportional to the physical properties of the conditioned granular material.

Another object is to provide apparatus as set forth above wherein the means for compacting the sample of granular material comprises a moving endless belt and a roller for compacting a sample of granular material on the moving belt.

Another object is to provide apparatus as set forth above wherein the means for determining the physical properties of the compacted continuous sample of granular material comprises a sled positioned to ride on the compacted sample of granular material and a vertically movable wheel supported by the sled and in contact with the compacted sample of granular material.

Another object is to provide apparatus as set forth above wherein the means for producing an electrical signal proportional to the physical properties of the sample of granular material comprises a low voltage differential transformer including a core and armature, one of which is supported on the sled and the other of which is movable with the wheel in engagement with the compacted sample of granular material.

Another object is to provide physical properties testing apparatus which is simple in construction, economical to manufacture and efficient in use.

Other objects and features of the invention will become apparent as the description proceeds, especially when taken in conjunction with the accompanying drawing, illustrating a preferred embodiment of the invention, wherein.

Figure 1:
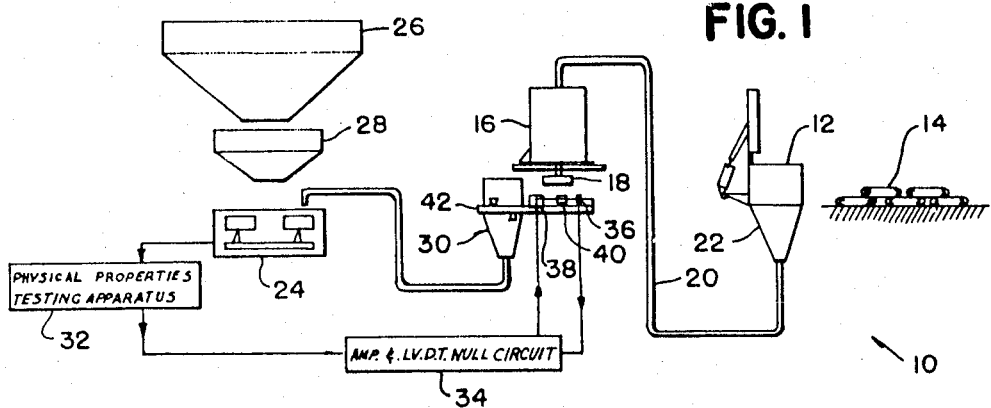
FIGURE 1 is a diagrammatic representation of granular material conditioning apparatus including physical properties testing apparatus constructed in accordance with the invention.

With particular reference to the figures of the drawing, one embodiment of the present invention will now be considered in detail.

The granular material conditioning apparatus 10 illustrated in FIGURE 1 includes the automatic sack opening structure 12 for opening sacks 14 of bonding agent for granular material placed therein, storage bin 16, dispensing structure 18 therefor, and the pneumatic conveyor 20 extending between the storage bin 16 and the tank 22 into which the powdered material from sack opening apparatus 12 falls.

The granular material conditioning apparatus further includes the mixer 24 for mixing granular material and additive, such as the bonding agent in sacks 14, to produce granular material having predetermined physical properties, the granular material storage bin 26 and the batching hopper 28 positioned above the mixer 24, the weighing and transfer apparatus 30, the physical properties testing apparatus 32 and an electrical feed back circuit 34 from the physical properties testing apparatus 32 to the weighing and transfer apparatus 30 positioned relative to each other as shown best in FIGURE 1.

In over-all operation of the granular material conditioning apparatus 10 illustrated in FIGURE 1, as better set forth in the above referenced copending patent application, granular material from the granular material storage bin 26 is mixed in the batching hopper 28 with desired additives, after which the granular material is fed into the granular material mixer 24 for further conditioning. The bonding agent from sacks 14 having been transferred into the storage bin 16 through the automatic sack opening structure 12, storage tank 22 and pneumatic conveyor structure 20 is metered into the weighing and transfer apparatus 30 by dispensing structure 18 operable in conjunction with storage bin 16.

When a predetermined amount of bonding agent has been metered into the weighing and transfer apparatus 30, it is automatically transferred into the mixer 24 where it is mixed to provide granular material having predetermined physical properties which physical properties may be continuously tested by the physical properties testing apparatus 32 of the invention.

The physical properties testing apparatus then produces an electrical signal in accordance with the physical properties of the conditioned granular material measured by the physical properties testing apparatus which is used to adjust the weighing and transfer apparatus 30 to provide a greater or lesser quantity of bonding agent for the next succeeding batch of granular material conditioned in mixer 24.

Such operation and the particular details of the weighing and transfer apparatus 30 are more fully set forth in the above referenced copending application and will not therefore be considered in detail herein.

In general however it will be understood that the physical properties testing apparatus provides an electrical signal to the amplifier and low voltage differential transformer null circuit 34 which varies as the physical properties tested vary. Simultaneously a second low voltage transformer 36 produces a signal in accordance with the balance condition of the weighing and transfer apparatus 30. A motor 38 is operable in response to the difference in the electrical signals from the low voltage differential transformer 36 and the low voltage differential transformer 74 of the physical properties testing apparatus 32 to move a weight 40 along the balance beam 42 to vary the amount of bonding agent required to balance beam 42. The motor 38 simultaneously adjusts the low voltage differential transformer 36 to provide a null signal for the motor 38 in accordance with the desired quantity of bonding agent in the succeeding batch of conditioned granular material as determined by the physical properties tested of a previous batch of granular material.

Figure 2:
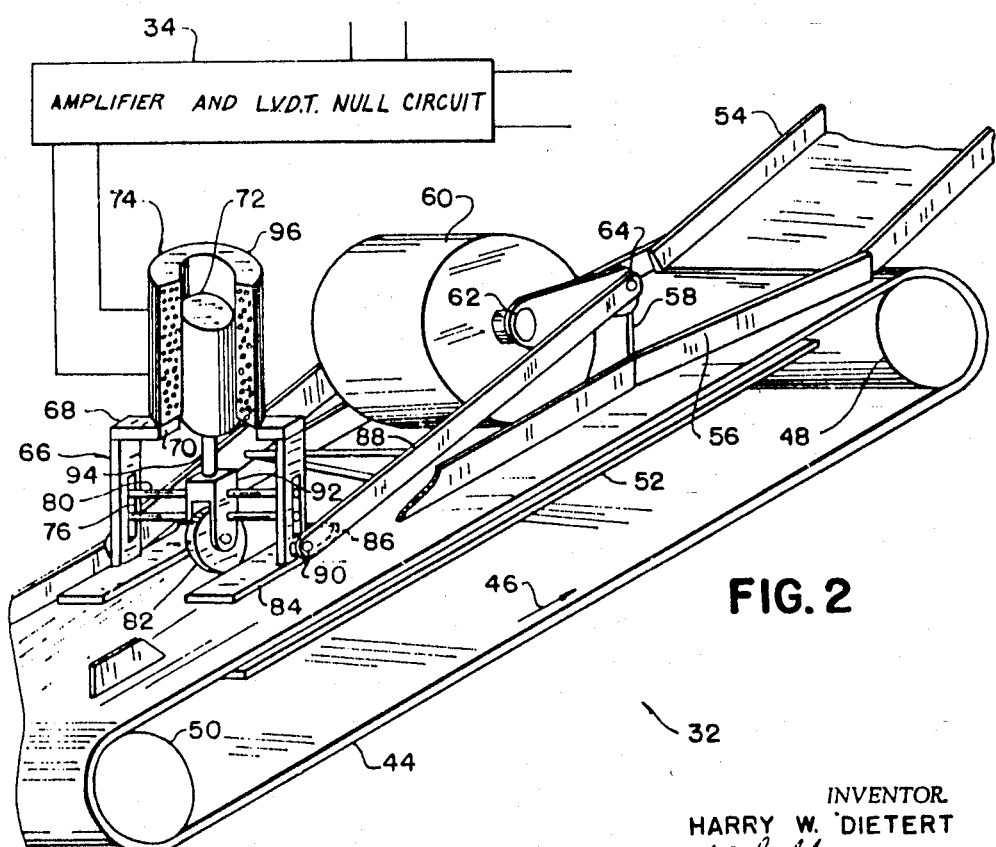
FIGURE 2 is a partially broken away perspective view of physical properties testing apparatus constructed in accordance with the invention for use in the granular material conditioning apparatus illustrated in FIGURE 1.

Referring more specifically to FIGURE 2, the physical properties testing apparatus 32 comprises an endless conveyor belt 44 movable in the direction indicated by arrow 46 around drive rollers 48 and 50 at the opposite ends thereof. The rigid plate 52 is provided under the upper portion of the belt 44 on which granular material is deposited for testing of the physical properties thereof.

A chute 54 is provided extending from the mixer 24 to the endless belt 44 and supplies a substantially constant sample of granular material from mixer 24 to the physical properties testing apparatus 32 in conjunction with convenient means, such as a sample feed auger (not shown). The chute 54 is operable in conjunction with guiding side members 56 and the vertically extending cutoff plate 58 supported by convenient means between side members 56 to provide a substantially constant quantity of granular material between the sides 56 at the compacting roller 60.

The means for compacting a uniform sample of granular material as shown in FIGURE 2 comprises the roller 60 extending between the sides 56 and mounted for pivotal movement on pivot mounting 62 which is in turn pivotally mounted on pivot mounting 64. The pivot mounting 64 is held in a predetermined rigid position and may be supported by the same structure supporting the cut-off plate 58 if desired.

The sled 66 includes the inverted U-shaped yoke 68 having an opening 70 therethrough for passage of the core 72 of the low voltage differential transformer 74. The slots 76 are provided in the legs of yoke 68 to permit vertical movement of the guide shafts 80 of wheel structure 82. Sled 66 further includes the runners 84 having the upturned ends 86 thereon to permit riding of the sled 66 on top of a sample of granular material compacted by roller 60 and travelling on the conveyor belt 44 between the sides 56.

Sled 66 is held in a predetermined position longitudinally of the conveyor belt 44 and is permitted slightly arcuate vertical movement with respect thereto by the links 88 at opposite sides thereof pivoted at one end to the fixed position pivot structure 64 and at the other end to the pivot structure 90 carried by the sled 66.

The wheel structure 82 as illustrated best in FIGURE 2 includes the wheel supported for rotation on the bifurcated member 92. Bifurcated member 92 is in turn supported for vertical movement on the shafts 80 positioned within the slots 76 in the legs of the yoke 68. Bifurcated member 92 further carries with it the core 72 of differential transformer 74 suspended on shaft 94.

The coil 96 of low voltage differential transformer 74 is connected directly to the amplifier and low voltage differential transformer null circuit 34, as illustrated best in FIGURE 2.

Thus in over-all operation, during the mixing of a particular batch of granular material in mixer 24 which has had a predetermined amount of bonding agent placed therein in accordance with the previous setting of the weighing and transfer apparatus 30, a continuous sample of granular material from the mixer 24 is passed down chute 54 between the guiding sides 56 and a predetermined volume thereof is permitted to pass the cut-off plate 58. The predetermined volume of granular material passing cut-off plate 58 is compacted by roller 60 and is passed beneath the sled 66 between the guiding sides 56.

The sled 66 rides on top of the compacted sample of granular material while the wheel 82 penetrates the compacted sample of granular material a varying amount in proportion to the physical properties of the granular material in the sample of conditioned granular material being tested. The difference in penetration of the wheel 82 of the granular material passing beneath the sled 66 will produce differential movement between the core 72 and coil 96 of the transformer 74 to produce a signal out of differential transformer 74 to the amplifier and differential transformer null circuit 34 proportional to the physical properties of the sample of granular material.

The weighing and balance apparatus 30 is then set for the next batch of granular material to be conditioned in accordance with the physical properties of the immediately preceding batch as previously indicated in accordance with the signal out of differential transformer 74.

While one embodiment of the present invention has been considered in detail, it will be understood that other embodiments and modifications thereof are contemplated. It is therefore the intention to include all embodiments and modifications of the invention as are defined by the appended claims within the scope of the invention.

What I claim as my invention is:

1. Physical properties testing apparatus comprising means for providing a substantially uniform sample of granular material including a moving endless belt on which a sample of granular material is deposited, guiding sides and a strike off plate positioned over the belt to permit passing thereby of only a uniform cross section of the sample of granular material, means for substantially uniformly compacting the uniform sample of granular material, a sled supported for movement over the top of the compacted uniform sample of granular material, means supported by and movable with respect to the sled for producing movement relative thereto proportional to the physical properties of the compacted sample of granular material, and means for producing an electrical signal proportionate to said relative movement.

2. Physical properties testing apparatus comprising means for providing a substantially uniform sample of granulated materials, means for substantially uniformly compacting the uniform sample of granular material including a roller adapted to rest on top of the uniform sample of granular material, and means for pivotally mounting the roller for substantially vertical arcuate movement, a sled support for movement over the top of the compacted uniform sample of granular material, means supported by and movable with respect to the sled for producing movement relative thereto proportional to the physical properties of the compacted sample of granular material, and means for producing an electrical signal proportional to said relative movement.

3. Physical properties testing apparatus comprising means for providing a substantially uniform sample of granular material, means for substantially uniformly compacting the uniform sample of granular material, a sled supported for movement over the top of the compacted uniform sample of granular material including an inverted U-shaped yoke including runners secured to the ends of the leg portions of the inverted U-shaped yoke and connecting links secured to the sled and pivotally mounted to the sled yoke at one end and to a fixed pivot point at the other end, means supported by and movable with respect to the sled for producing movement relative thereto proportional to the physical properties of the compacted sample of granular material, and means for producing an electrical signal proportional to said relative movement.

4. Physical properties testing apparatus comprising means for providing a substantially uniform sample of granular material, means for substantially uniformly compacting the uniform sample of granular material, a sled supported for movement over the top of the compacted uniform sample of granular material, means supported by and movable with respect to the sled for producing movement relative thereto proportional to the physical properties of the compacted sample of granular material including a bifurcated member, means operably associated with the sled and connected to the bifurcated member for guiding the bifurcated member in vertical movement with respect to the sled, and a wheel supported by said bifurcated member in contact with the surface of the compacted sample of granular material, and means for producing an electrical signal proportional to said relative movement.

5. Structure as set forth in claim 4 wherein the means for producing an electrical signal variable in accordance with the relative movement comprises a linear variable differential transformer having relatively movable core and coil members, one of which members is secured to the sled and the other of which members is secured to the bifurcated member.

6. Physical properties testing apparatus comprising a moving endless conveyor belt, a plate positioned immediately under the top of the conveyor belt guiding sides and a cut-off plate positioned over the top of the conveyor belt for permitting a constant cross section of a sample of granular material to proceed down the conveyor belt in the direction of movement thereof, a roller mounted transversely of the conveyor belt resting on top of the uniform sample of granular material for compacting the uniform sample of granular material supported by connecting links pivotally connected to said roller axially thereof at one end and to a fixed pivot at the other end, a sled including an inverted U-shaped yoke having runners on the ends of the leg portions thereof and slots centrally of the leg portions thereof, connecting links at each side of the yoke pivotally connected at one end to the ends of the legs of the yoke and at the other end to the fixed pivot, a bifurcated member positioned between the legs of the yoke, shafts extending through the bifurcated member and into the slots in the legs of the yoke for permitting vertical movement between the sled and the bifurcated member, a wheel carried by the bifurcated member and resting on the surface of the compacted sample of granular material and a linear variable differential transformer having a core and a coil member, one of which members is secured to the yoke and the other of which members is secured to said bifurcated member for producing an electrical signal proportional to the relative position between the wheel and sled as an indication of the physical properties of the compacted sample of granular material.

References Cited by the Examiner
UNITED STATES PATENTS

| | | | |
|---|---|---|---|
| 2,379,835 | 7/1945 | Sisler | 73—63 |
| 2,535,026 | 12/1950 | Anderson | 73—73 |
| 3,106,437 | 10/1963 | Michalski | 73—105 |
| 3,149,489 | 9/1964 | Schmaeng | 73—144 |
| 3,194,061 | 7/1965 | Sorenson et al. | 73—81 |
| 3,237,310 | 3/1966 | Reiner | 73—146 |

RICHARD C. QUEISSER, *Primary Examiner.*

J. H. WILLIAMSON, *Assistant Examiner.*